(12) United States Patent
Ellingboe et al.

(10) Patent No.: US 9,941,736 B1
(45) Date of Patent: Apr. 10, 2018

(54) SECONDARY POWER SYSTEM FOR LIGHT STANDARD

(71) Applicants: Thomas Roy Ellingboe, Blaine, MN (US); Robert J. Barriger, Andover, MN (US); Thomas Ryan Ellingboe, Carver, MN (US)

(72) Inventors: Thomas Roy Ellingboe, Blaine, MN (US); Robert J. Barriger, Andover, MN (US); Thomas Ryan Ellingboe, Carver, MN (US)

( * ) Notice: Subject to any disclaimer, the term of this patent is extended or adjusted under 35 U.S.C. 154(b) by 148 days.

(21) Appl. No.: 15/016,488

(22) Filed: Feb. 5, 2016

Related U.S. Application Data

(60) Provisional application No. 62/113,361, filed on Feb. 5, 2015.

(51) Int. Cl.
*H02J 9/06* (2006.01)
*H01R 24/76* (2011.01)
*H01R 13/447* (2006.01)

(52) U.S. Cl.
CPC ............ *H02J 9/061* (2013.01); *H01R 13/447* (2013.01); *H01R 24/76* (2013.01)

(58) Field of Classification Search
CPC .................................. H02J 9/061; H01R 24/76
See application file for complete search history.

(56) References Cited

U.S. PATENT DOCUMENTS

| | | | |
|---|---|---|---|
| 3,242,252 A | 3/1966 | Bergenstein | |
| 3,300,570 A | 1/1967 | Spiece | |
| 3,862,411 A * | 1/1975 | Persson | F21S 8/086 174/38 |
| D270,831 S | 10/1983 | Jensen | |
| 4,518,896 A * | 5/1985 | Miles, Jr. | F21V 23/00 315/162 |
| 4,519,657 A * | 5/1985 | Jensen | G07F 15/003 174/38 |
| 5,523,653 A * | 6/1996 | Plank, Jr. | H02H 7/006 315/119 |
| 5,820,255 A * | 10/1998 | Carrington | E04H 12/003 174/45 R |
| D437,426 S | 2/2001 | Ginsburg | |
| 6,222,503 B1 | 4/2001 | Gietema | |
| 6,303,857 B1 | 10/2001 | Ginsburg | |

(Continued)

OTHER PUBLICATIONS

Hubbell," watertight wiring device," 2014, pp. 1-11.*

*Primary Examiner* — Thienvu Tran
*Assistant Examiner* — Pinping Sun
(74) *Attorney, Agent, or Firm* — Michael A. Bondi; Moss & Barnett (57) ABSTRACT

A secondary power system for a light standard having primary power system that is operable at a first voltage. The secondary power system includes an electrical outlet, a power supply and an electrical cord. The electrical outlet has at least one receptacle. The electrical outlet is attachable to the light standard. The power supply is capable of converting an input current at the first voltage to an outlet current at a second voltage that is different than the first voltage. The power supply includes a first connection point and a second connection point. The power supply is mountable in an interior of the light standard. The electrical cord has a first end and a second end. The first end is attached to the electrical outlet. The second end is attached to the power supply.

15 Claims, 5 Drawing Sheets

(56) References Cited

U.S. PATENT DOCUMENTS

| | | | |
|---|---|---|---|
| 6,476,523 B1* | 11/2002 | Lee | H01R 13/70 307/141 |
| 6,483,470 B1 | 11/2002 | Hohnstein | |
| 6,872,883 B2 | 3/2005 | Ginsburg | |
| RE39,093 E | 5/2006 | Savoca | |
| 7,059,096 B2 | 6/2006 | Kuebler | |
| RE40,228 E | 4/2008 | Savoca | |
| 7,723,612 B2 | 5/2010 | Butler | |
| 7,723,862 B1* | 5/2010 | Spillman | H05B 37/00 307/11 |
| D702,104 S | 4/2014 | Butler | |
| 9,559,773 B1* | 1/2017 | Maa | H04B 10/116 |
| 2003/0048587 A1* | 3/2003 | Lai | H02H 3/04 361/42 |
| 2006/0044789 A1* | 3/2006 | Curtis | F21S 8/088 362/152 |
| 2013/0107496 A1* | 5/2013 | Bisberg | F21V 29/02 362/84 |
| 2013/0201658 A1* | 8/2013 | Bogart | F21S 4/001 362/95 |
| 2014/0094042 A1* | 4/2014 | Lamb | B60D 1/28 439/35 |

* cited by examiner

SECONDARY POWER SYSTEM FOR LIGHT STANDARD

REFERENCE TO RELATED APPLICATION

This application claims priority to Provisional Applic. No. 62/112,361, filed on Feb. 5, 2015, the contents of which are incorporated herein by reference.

FIELD OF THE INVENTION

The invention relates to electrical products. More particularly, the invention relates to a secondary power system for a light standard.

BACKGROUND OF THE INVENTION

There has been an increase in the use of ornamental or seasonal lighting in a variety of commercial applications such as office complexes, retail developments, institutional campuses and downtown streetscape areas. This ornamental or seasonal lighting, or any such device is typically used in conjunction with lighting poles that provide general illumination in and around the commercial location.

There has also been sharp increase of the need for security cameras on residential and commercial buildings, which require 120 volt for the heated camera enclosures. Downtown public spaces also have increased their use of security cameras & wireless antennas, both of which require 120 volt power.

It is customary for the ornamental or seasonal lights, or any other such device to be operated by attachment to a conventional 120 volt power source. Unfortunately, outdoor lighting that is typically used in conjunction with commercial applications is not typically powered by 120 volt power.

Because of the different power requirements used by ornamental or seasonal lights versus commercial outdoor lighting, it is not possible to directly connect the ornamental or seasonal lights, or any other such device to the power provided to the commercial outdoor lighting.

One option to provide power to the ornamental or seasonal lighting or any such device is by running a second power line. A significant drawback of this option is the cost associated with the second power line as well as the cost to install the second power line. In locations where the ground is finished, it may be extremely undesirable to dig up the asphalt, concrete or tile to bury the second power line.

An option to add a separate 120 volt branch circuit during the original installation of the light poles involves increasing the size of the conductors to accommodate for the severe voltage drop that will be encountered, and is very expensive and not real practical.

Another option that is often used is to install an external transformer on the lighting standard that converts the power to 120 volts for use by the ornamental or seasonal lighting devices or any such remote device requiring 120 volts. A drawback of this approach is that the external transformer may be aesthetically undesirable. Additionally, the external transformer may be subject to vandalism and can be a safety concern if not installed or maintained correctly.

SUMMARY OF THE INVENTION

An embodiment of the invention is directed to a secondary power system for a light standard having primary power system that is operable at a first voltage. The secondary power system includes an electrical outlet, a power supply and an electrical cord. The electrical outlet has at least one receptacle. The electrical outlet is attachable to the light standard. The power supply is capable of converting an input current at the first voltage to an outlet current at a second voltage that is different than the first voltage. The power supply includes a first connection point and a second connection point. The power supply is mountable in an interior of the light standard. The electrical cord has a first end and a second end. The first end is attached to the electrical outlet. The second end is attached to the power supply.

Another embodiment of the invention is directed to a multi-voltage light standard system that includes a light standard, an electrical outlet, a power supply and an electrical cord. The light standard has primary power system that is operable at a first voltage. The electrical outlet has at least one receptacle. The electrical outlet is attached to the light standard. The power supply is capable of converting an input current at the first voltage to an outlet current at a second voltage that is different than the first voltage. The power supply includes a first connection point and a second connection point. The electrical cord has a first end and a second end. The first end is attached to the electrical outlet. The second end is attached to the power supply so that the power supply is in an interior of the light standard.

Another embodiment of the invention is directed to a method of retrofitting a light standard to provide a secondary power system. The light standard includes an electrical component that is operable at a first voltage. An electrical outlet is attached to the light standard. The electrical outlet has at least one receptacle. A first end of an electrical cord is attached to the electrical outlet. A first connection point on a power supply is attached to a second end of the electrical cord. The power supply is capable of converting an input current at the first voltage to an outlet current at a second voltage that is different than the first voltage. The electrical outlet and the electrical cord support the power supply in an interior of the light standard.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
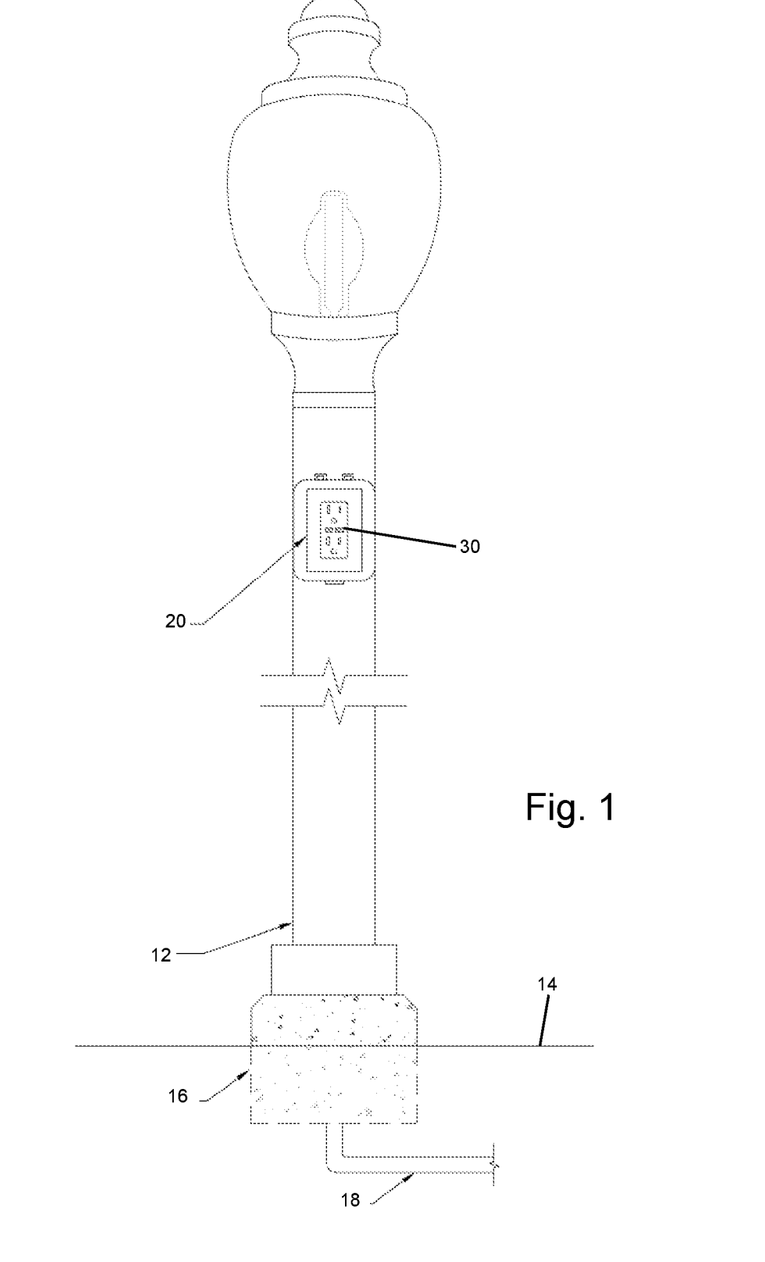
FIG. 1 is a first side view of a light standard in which a secondary power system is installed according to an embodiment of the invention.
Figure 2:
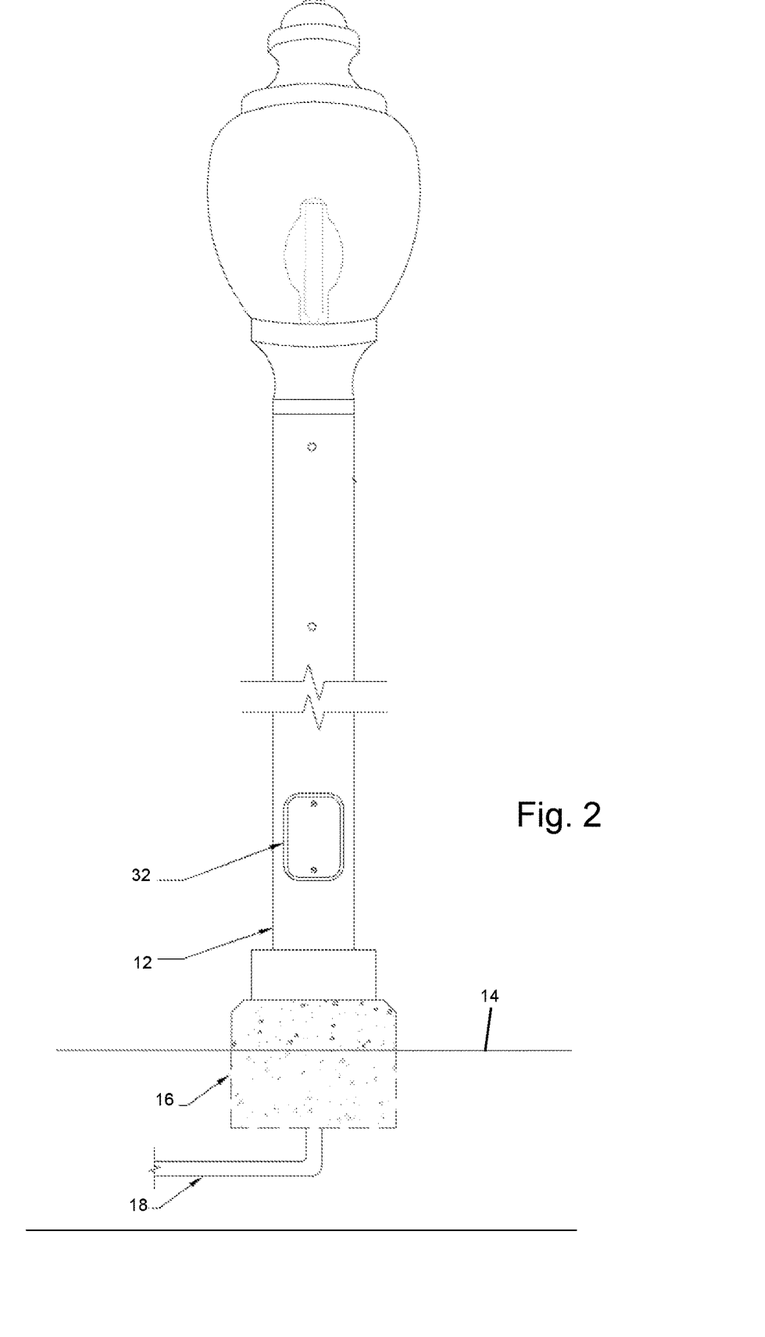
FIG. 2 is a second side view of the light standard.
Figure 3:
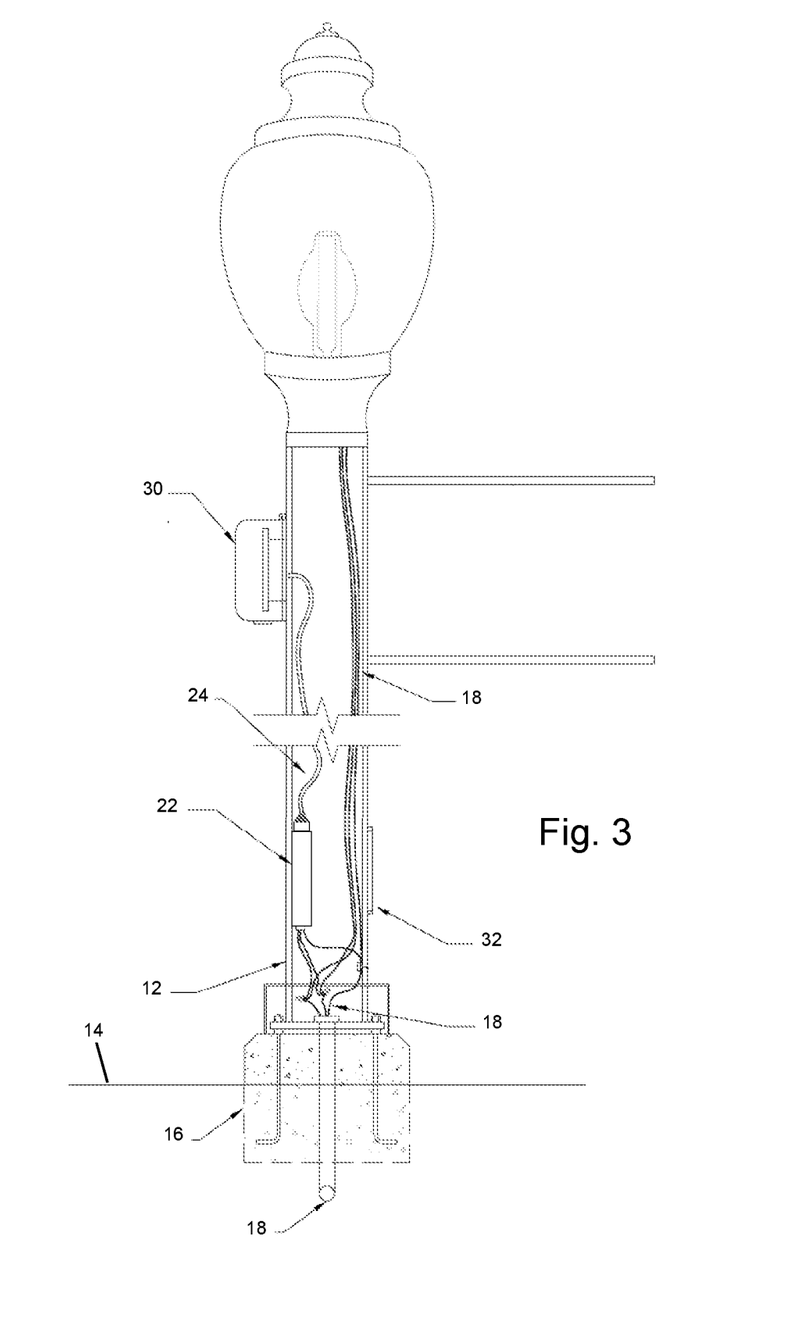
FIG. 3 is a sectional view of the light standard from a front side thereof.

An embodiment of the invention is directed to a secondary power system 10 that is used in conjunction with a light standard 12, as illustrated in FIGS. 1-3. The secondary power system 10 thereby enables a secondary power source to be easily and inexpensively added to the light standard 12.

The light standard 12 may be mounted in a ground surface 14 such as using a concrete base 16 that is at least partially mounted below the ground surface 14. In certain embodiments, power is provided to the light standard 12 using an electrical cable 18 that extends from the light standard below the ground surface 14. A person of skill in the art will appreciate that the electrical cable 18 may be run through a conduit such as when required by the local building code.

Other than an electrical outlet 20 or an electrical switch (not shown), the components of the secondary power system 10 are mounted inside of the light standard 12. This configuration thereby minimizes the potential of damage or theft of the secondary power system 10.

In addition to the electrical outlet 20, the secondary power system 10 may generally include a power module 22 and an electrical cord 24 that operably connects the electrical outlet 20 and the power module 22.

In certain embodiments, the electrical outlet 20 is a duplex outlet that includes a ground fault circuit interrupter to thereby protect persons from injury or electrical objects from damage if any portion of the electrical circuit is comprised. In certain embodiments, the electrical outlet 20 may have a decorator style shape that enables a conventional electrical cover to be used therewith. The electrical outlet 20 may be required to operate on a sinusoidal or modified electrical sine wave.

Depending on the intended use location, a weather resistant cover 30 may be used in conjunction with the electrical outlet, as illustrated in FIG. 3. The weather resistant cover 30 is moved to an open position when it is desired to attach an electrical plug to the electrical outlet 20. Thereafter, the weather resistant cover is closed to minimize the potential of moisture coming into contact with the electrical outlet 20.

The electrical cord 24 typical includes three conductive wires, the size of which is determined based upon the anticipated draw by the ornamental or seasonal lighting or other objects that are intended to be connected to the electrical outlet 20. The conductive wires are covered with a protective coating that is selected based upon the conditions to which the electrical cord 24 is anticipated to encounter. In certain embodiments, the electrical cord 24 may have a 600 volt rating.

The electrical cord 24 may be provided in different length intervals so that the electrical cord 24 is of a sufficient length that is suited for the intended installation application. In certain embodiments, the electrical cord 24 is available in 3 foot length intervals.

A first end of the electrical cord 24 is attached to the electrical outlet 20. In certain embodiments, the electrical cord 24 is integrally formed or fixedly attached to a housing on the back of the electrical outlet 20. Such a configuration reduces the potential of the electrical cord 24 detaching from the electrical outlet 20 housing.

In certain embodiments, the attachment of the electrical cord 24 to the electrical outlet 20 is sufficiently robust such that the electrical cord 24 resists disconnection from the power module 22 when the power module 22 happens to be hanging from the electrical cord 24 and not in a static horizontal position.

Figure 4:
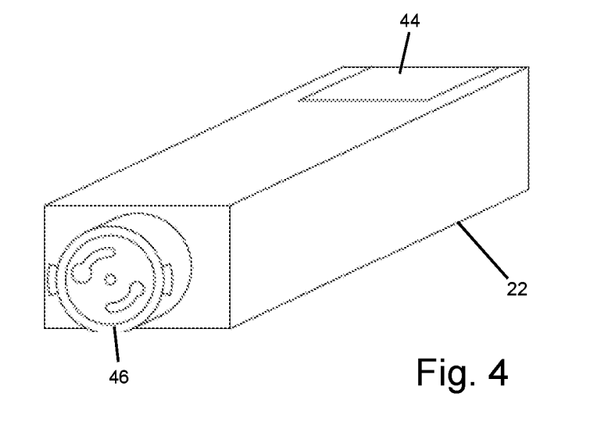
FIG. 4 is a front perspective view of a power module for use in the secondary power system.

A second end of the electrical cord 24 may include a connector 40 that facilitates removable attachment of the electrical cord to the power module 22. In certain embodiments, the connector 40 may include a generally round shape. During the connection process, the connector 40 is initially engaged with the power module 22 and then rotated to lock into place. The connector 40 may also provide a waterproof cover such that any water that enters the light standard 12 is substantially prevented from entering the power module 22. An example of one suitable connection mechanism 46 on the power module 22 is illustrated in FIG. 4. Alternatively or additionally, the electrical cord 24 may attach to a lower end of the power module 22 to further minimize of the potential of water or other liquids from entering the power module 22.

A primary function of the power module 22 is to convert the power from a voltage that is used in the light standard 12 to a voltage that is suited for use by the ornamental, seasonal lighting or any such item. In certain embodiments, the input power to the power module 22 is at a voltage of 208 volts, 240 volts, 277 volts or 480 volts. In certain embodiments, the output power from the power module 22 is at 120 volts and 60 hertz producing a sinusoidal or modified sine wave.

The wattage of the power module 22 is selected based upon the power needed by the ornamental, seasonal lighting or any such item. In certain embodiments, the wattage of the power module 22 is between about 250 va and 1,000 va.

Figure 5:
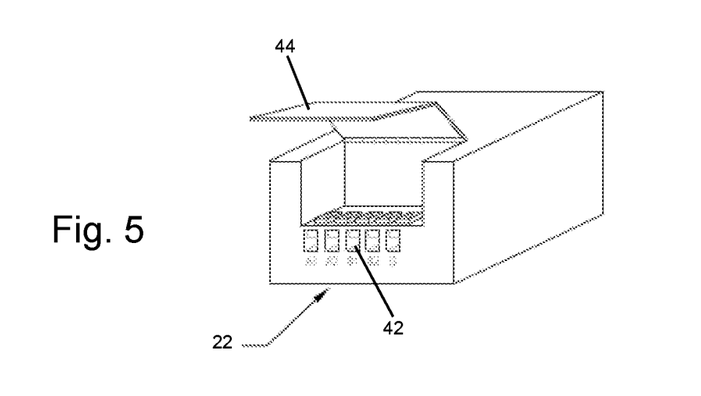
FIG. 5 is a back perspective view of the power module.
Figure 6:
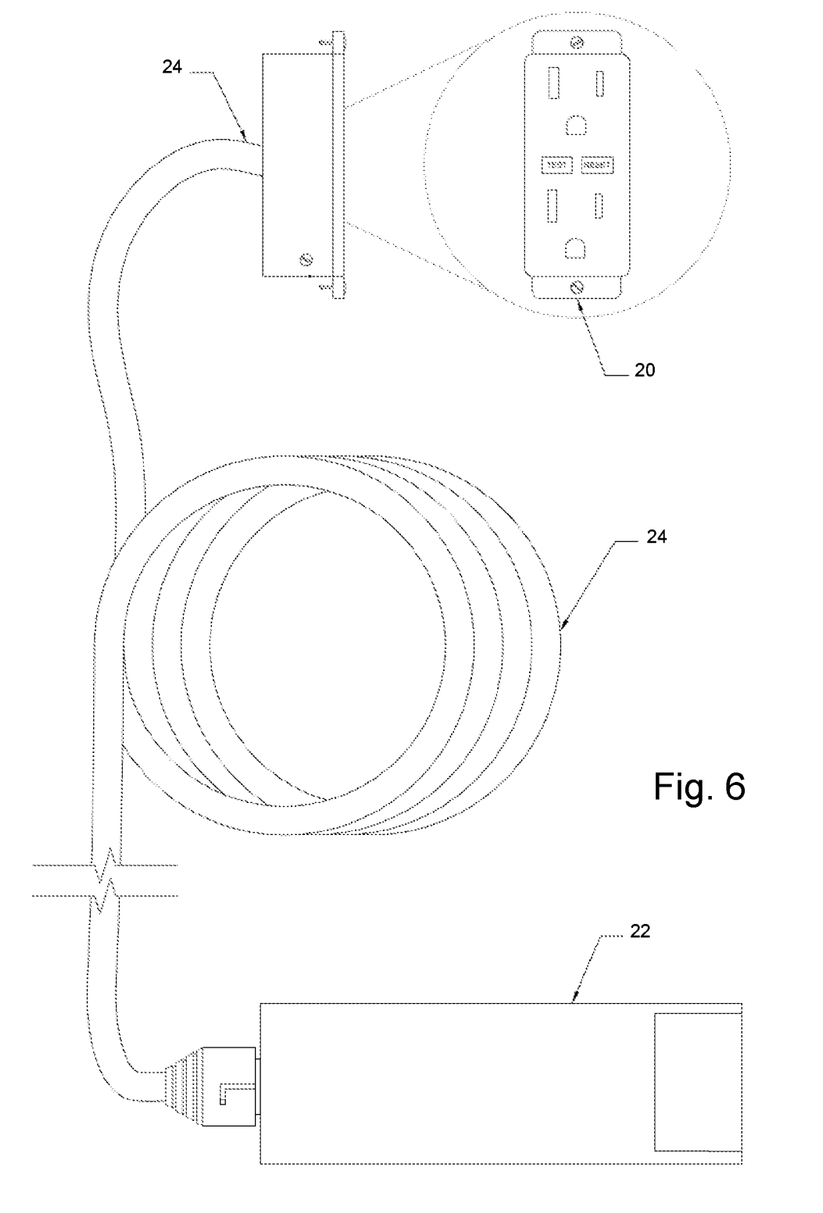
FIG. 6 is a top view of the secondary power system.

The wires from the primary power system may be attached to a lower end of the power module 22 such as using a plurality of terminals 42 that are illustrated in FIG. 5. A cover 44 may be provided to cover at least a portion of the terminals 42 after the wires are attached. In certain embodiments the cover is pivotally attached to the power module 22.

The power module 22 may also include an overload protection system that protects the power module 22 from damage. A person of skill in the art will appreciate that the overload protection system may assume a variety of configurations. In certain embodiments, a reset button may be provided on a surface of the power module 22. Alternatively or additionally, the reset button may be provided so that it is accessible from an outer surface of the light standard 12. Such a configuration enables a user to depress the reset button without accessing the interior of the light standard. In one such configuration, the reset button is proximate to the electrical outlet 20 so that the reset button could be protected by the weather resistant enclosure 30.

The power module 22 may have an elongated shape that enables the power module 22 to be extended through an opening 32 in the light standard 12. For example, the power module 22 may be insertable through a conventional light standard hand hole. In certain embodiments, the power module has a width of about 1.5 inches, a depth of about 1 inch and a length of about 6 inches.

The secondary power system may also include a control mechanism that is used in conjunction with turning on and off of the electrical outlet 20. An example of one such control mechanism is a switch, time clock, an integrated lighting control system, building management system, a Wi-Fi module and a radio frequency module. The control mechanism may be associated with one or more of the power module 22 and the electrical outlet 20.

A mounting mechanism may be used to attach the power module 22 to an inner surface of the light standard 12. A person of skill in the art will appreciate that the mounting mechanism may have a variety of configurations. Such a mounting mechanism may retain the power module 22 along the inner surface of the light standard 12. Alternatively, the power module 22 may hang using the electrical cord 24 that operably attaches the power module 22 to the electrical outlet 20. An advantage of this approach is that it is not necessary to secure anything to the inner surface of the light standard 12, which could present challenges because of the relatively small size of the opening 32 and which could potentially impact the structural integrity of the light standard 12.

In use, an opening 32 is formed in the light standard 12 through which the electrical cord 24 and/or a portion of the electrical outlet 20 can extend. This opening 32 can be hand hole that is typically provided in the light standard 12. The cover is removed from its position that substantially covers the opening 32. The power module 22 is inserted into the light standard 12 and then attached to the primary electrical system wires in the light standard 12.

While it is illustrated that the secondary power system is used in conjunction with a light standard 12, it is possible to use the secondary power system in other applications where there is electricity at a voltage that is different than a voltage used by the ornamental, seasonal lighting or any such device. Similarly, the secondary power system can be used to provide power to devices other than ornamental or seasonal light.

Additionally, while it is described that the secondary power system is used to provide power at a voltage that is lower than the voltage used by the primary electrical system, it is possible for the secondary power system to provide electricity at a voltage that is greater than the voltage used by the primary electrical system.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A secondary power system for a light standard having an access opening and a primary electrical component that is operable at a first voltage, wherein the primary electrical component is attached to an electric power source that delivers electric current at the first voltage and wherein the secondary power system comprises:
   an electrical outlet comprising at least one receptacle, wherein the electrical outlet is attachable to the light standard;
   a power supply that is capable of converting the electric current at the first voltage to a second voltage that is different than the first voltage, wherein the power supply comprises a first connection point and a second connection point and wherein the power supply is capable of being passed through the access opening to an interior of the light standard and wherein the power supply is mountable to an interior surface of the light standard with a mounting mechanism; and
   an electrical cord having a first end and a second end, wherein the first end is attached to the electrical outlet and wherein the second end is attached to first connection point on the power supply.

2. The secondary power system of claim 1, wherein the second end is removably attached to the first connection point using a twist lock mechanism and wherein a waterproof cover substantially covers the twist lock mechanism.

3. The secondary power system of claim 1, wherein the power supply further comprises an overload protection system.

4. The secondary power system of claim 3, wherein the overload protection system comprises a reset button that is mounted proximate the electrical outlet.

5. The secondary power system of claim 1, wherein the first voltage is greater than the second voltage and wherein the secondary power system is capable of operating at sinusoidal or modified sine wave.

6. The secondary power system of claim 1, wherein the electrical outlet further comprises a protective cover.

7. A multi-voltage light standard system comprises:
   a light standard having an access opening and a primary electrical component that is operable at a first voltage, wherein the primary electrical component is attached to an electric power source that delivers electric current at the first voltage;
   an electrical outlet comprising at least one receptacle, wherein the electrical outlet is attached to the light standard;
   a power supply that is capable of converting the electric current at the first voltage to a second voltage that is different than the first voltage, wherein the power supply comprises a first connection point and a second connection point, wherein the second connection point is attached to the electric power source and wherein the power supply is capable of being passed through the access opening to an interior of the light standard and being attached to an interior surface of the light standard;
   an electrical cord having a first end and a second end, wherein the first end is attached to the electrical outlet and wherein the second end is attached to the first connection point on the power supply; and
   a mounting mechanism that attaches the power supply to the interior of the light standard.

8. The multi-voltage light standard system of claim 7, wherein the second end is removably attached to the first connection point using a twist lock mechanism and wherein a waterproof cover substantially covers the twist lock mechanism.

9. The multi-voltage light standard system of claim 7, wherein the power supply further comprises an overload protection system.

10. The multi-voltage light standard system of claim 9, wherein the overload protection system comprises a reset button that is mounted proximate the electrical outlet.

11. The multi-voltage light standard system of claim 7, wherein the first voltage is greater than the second voltage and wherein the secondary power system is capable of operating at sinusoidal or modified sine wave.

12. The multi-voltage light standard system of claim 7, wherein the electrical outlet further comprises a protective cover.

13. A method of retrofitting a light standard to provide a secondary power system, wherein the light standard comprises an access opening and a primary electrical component that is operable at a first voltage, wherein the primary electrical component is attached to an electric power source that delivers electric current at the first voltage and wherein the method comprises:

providing an electrical cord having a first end and a second end;

attaching an electrical outlet to the light standard, wherein the electrical outlet comprises at least one receptacle;

attaching the first end of the electrical cord to the electrical outlet;

passing the power supply through the access opening to an interior of the light standard, wherein the power supply comprises a first connection point and a second connection point, wherein the power supply is capable of converting the electric current at the first voltage to a second voltage that is different than the first voltage; and     attaching the first connection point on the power supply to the second end of the electrical cord;

attaching the second connection point to the electric power source;

attaching the power supply to the interior of the light standard with a mounting mechanism; and     covering the access opening with a cover.

14. The method of claim 13, and further comprising removably attaching the second end to the first connection point using a twist lock mechanism and substantially covering the twist lock mechanism with a waterproof cover.

15. The method of claim 13, wherein the power supply further comprises an overload protection system and wherein the overload protection system comprises a reset button that is mounted proximate the electrical outlet.

* * * * *